(12) United States Patent
Sakai

(10) Patent No.: US 8,406,582 B2
(45) Date of Patent: Mar. 26, 2013

(54) OPTICAL SWITCH AND METHOD FOR CONTROLLING OPTICAL SWITCH

(75) Inventor: Yoshio Sakai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 349 days.

(21) Appl. No.: 12/783,060

(22) Filed: May 19, 2010

(65) Prior Publication Data

US 2010/0303407 A1  Dec. 2, 2010

(30) Foreign Application Priority Data

May 26, 2009  (JP) .................. 2009-125942

(51) Int. Cl.
G02B 6/35 (2006.01)
(52) U.S. Cl. ........................................ 385/18
(58) Field of Classification Search .......... 385/18
See application file for complete search history.

(56) References Cited

U.S. PATENT DOCUMENTS

| 6,556,285 | B1 | 4/2003 | Dickson |
| 6,813,410 | B2 | 11/2004 | Oikawa |

FOREIGN PATENT DOCUMENTS

| JP | 2003-29175 A | 1/2003 |
| JP | 2005-500538 A | 1/2005 |
| JP | 2008-96673 A | 4/2008 |
| JP | 2009-503607 A | 1/2009 |
| WO | WO-2007/018758 A2 | 2/2007 |

OTHER PUBLICATIONS

Japanese Office Action mailed Sep. 25, 2012 for corresponding Japanese Application No. 2009-125942, with Partial English-language Translation.

Primary Examiner — Omar Rojas
(74) Attorney, Agent, or Firm — Fujitsu Patent Center (57) ABSTRACT

An optical switch includes a mirror to reflect an input light; a controller to generate a control signal representing a target rotation angle of the mirror; a generator to generate a low-frequency signal; an adder to superimpose the low-frequency signal on the control signal; a driver to drive the mirror with a drive voltage corresponding to the control signal on which the low-frequency signal is superimposed; a detector to detect a frequency component or a harmonic component of the low-frequency signal included in an output light reflected by the mirror; and a correction unit to correct the control signal based on the detection result by the detector. The generator determines an amplitude of the low-frequency signal according to the target rotation angle.

8 Claims, 10 Drawing Sheets

| INPUT PORT | OUTPUT PORT | INITIAL-VALUE MEMORY | | | | AMPLITUDE INFORMATION MEMORY | | | |
|---|---|---|---|---|---|---|---|---|---|
| | | x1 | x2 | y1 | y2 | x1 | x2 | y1 | y2 |
| 1 | 1 | 0 | 0 | 0 | 0 | 0.20 | 0.20 | 0.20 | 0.20 |
| 1 | 2 | 57 | 57 | 0 | 0 | 0.13 | 0.13 | 0.20 | 0.20 |
| 1 | 3 | 80 | 80 | 0 | 0 | 0.10 | 0.10 | 0.20 | 0.20 |
| ... | ... | ... | ... | ... | ... | ... | ... | ... | ... |
| 64 | 63 | −57 | −57 | 0 | 0 | 0.13 | 0.13 | 0.20 | 0.20 |
| 64 | 64 | 0 | 0 | 0 | 0 | 0.20 | 0.20 | 0.20 | 0.20 |

OPTICAL SWITCH AND METHOD FOR CONTROLLING OPTICAL SWITCH

CROSS-REFERENCE TO RELATED APPLICATIONS

This application is based upon and claims the benefit of priority of the prior Japanese Patent Application No. 2009-125942, filed on May 26, 2009, the entire contents of which are incorporated herein by reference.

FIELD

The present invention relates to an optical switch having a mirror and a method for controlling the same.

BACKGROUND

Conventionally, it is known that reflecting mirrors are provided in an embodiment of optical switches. This type of optical switch has a movable mirror between an input optical fiber and two or more output optical fibers. In this optical switch, the angle of the movable mirror is controlled according to the control signal that specifies the output optical fiber to which an optical signal is output. Generally, the angle of movable mirror is controlled by drive voltage. In this case, a desired output optical fiber is selected by controlling the drive voltage. Note that MEMS (Micro Electro Mechanical Systems) are sometimes used in the manufacturing process of optical switches in recent years.

In such an optical switch, the correspondence relationship between drive voltage and the rotation angle of a movable mirror changes, generally, due to the temperature or the age-related deterioration. In other words, for example, if the temperature around the optical switch changes, the rotation angle of a movable mirror is misaligned from a target angle, and thus light beam reflected by the movable mirror is not appropriately guided into an output optical fiber. In this case, the loss in the optical switch becomes large. For this reason, the configuration of dynamically correcting the correspondence relationship between drive voltage and the rotation angle of a movable mirror has been proposed.

As a related art, an optical switch in which a drive circuit provides drive voltage to a mirror unit, including a low-frequency superimposition circuit, a low-frequency detection unit, and a control circuit, has been proposed (for example, Japanese Laid-open Patent Publication No. 2003-29175). In such an optical switch, the low-frequency superimposition circuit superimposes a low-frequency signal on the drive voltage generated by the drive circuit. In other words, the mirror unit is driven by the drive voltage on which a low-frequency signal is superimposed. The low-frequency detection unit detects a low-frequency component from the output light that is reflected by the mirror unit. Then, the control circuit controls the drive voltage that is generated by the drive circuit based on the detected low-frequency component.

As another related art, the configuration for performing feedback control to reduce the alignment error between an input optical fiber and an output optical fiber has been proposed (for example, Japanese National Publication of International Patent Application No. 2005-500538).

As described above, configurations for dynamically adjusting a drive system of an optical switch has been proposed. However, in the related art, the angle sometimes cannot be adjusted appropriately depending on the rotation angle of a movable mirror. For example, in one related art, control is performed assuming that the rotation angle of a movable mirror changes linearly with respect to drive voltage. In this case, the angle of a movable mirror might not be adjusted appropriately, and thus the optical loss would be large in a region in which the drive voltage is large (i.e., the state in which the movable mirror has been largely rotated from an initial angle).

SUMMARY

According to an aspect of the invention, an optical switch includes: a mirror to reflect an input light; a controller to generate a control signal representing a target rotation angle of the mirror; a generator to generate a low-frequency signal; an adder to superimpose the low-frequency signal on the control signal; a driver to drive the mirror with a drive voltage corresponding to the control signal on which the low-frequency signal is superimposed; a detector to detect a frequency component or a harmonic component of the low-frequency signal included in an output light reflected by the mirror; and a correction unit to correct the control signal based on the detection result by the detector. The generator determines an amplitude of the low-frequency signal according to the target rotation angle.

According to another aspect of the invention, an optical switch includes: a mirror to reflect an input light; a controller to generate a control signal according to path information selecting an output optical fiber to which a reflected light from the mirror is guided out of a plurality of output optical fibers; a generator to generate a low-frequency signal; an adder to superimpose the low-frequency signal on the control signal; a driver to drive the mirror with a drive voltage corresponding to the control signal on which the low-frequency signal is superimposed; a detector to detect a frequency component or a harmonic component of the low-frequency signal included in the reflected light from the mirror; and a correction unit to correct the control signal based on a detection result by the detector. The generator determines an amplitude of the low-frequency signal according to the path information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
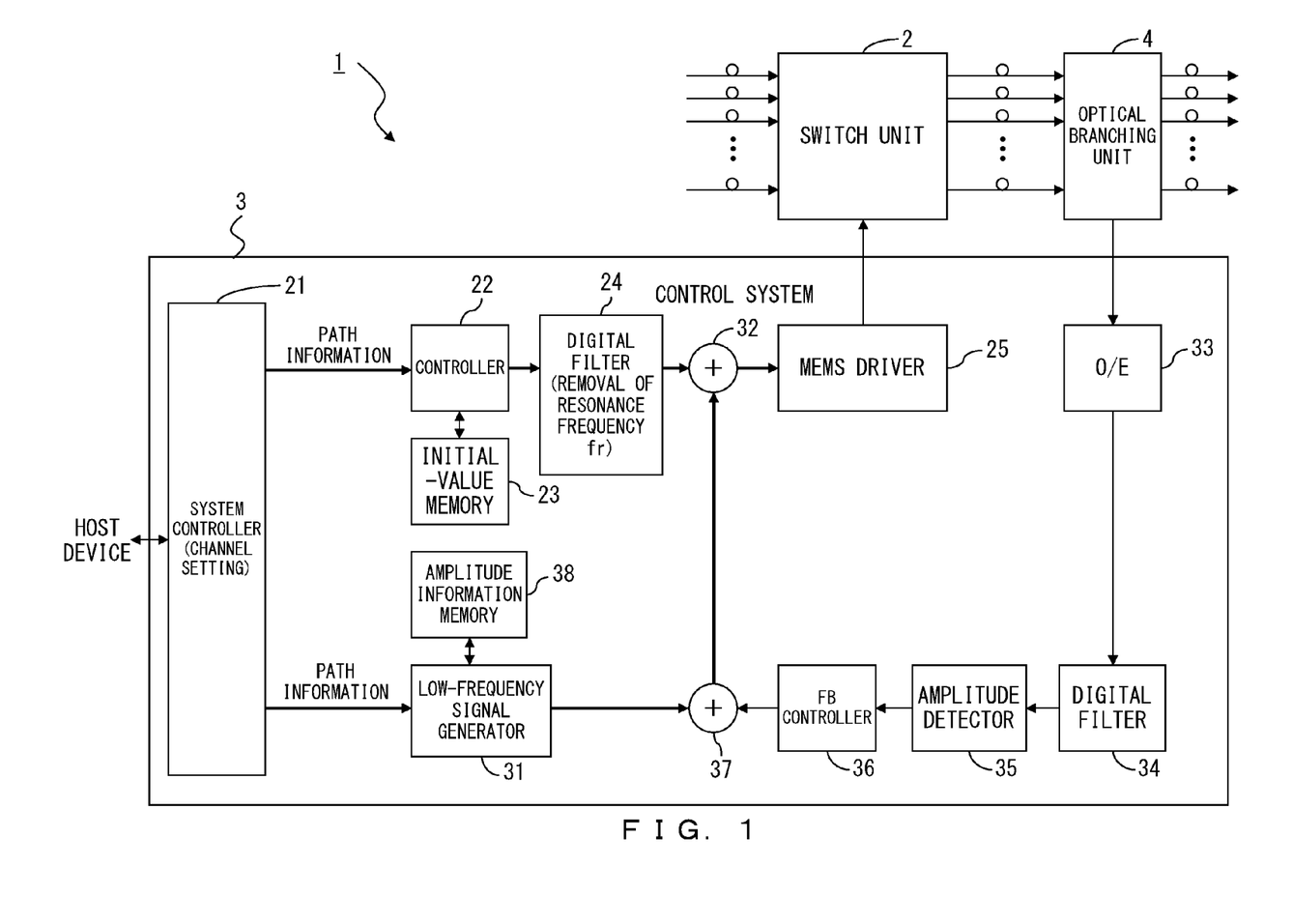
FIG. 1 is a diagram illustrating a configuration of an optical switch according to an embodiment.

FIG. 1 is a diagram illustrating a configuration of an optical switch according to an embodiment. An optical switch 1 according to the embodiment is provided with a switch unit 2 and a control system 3. The optical switch 1 is used, for example, for switching a communication route in an optical node of an optical communication system.

The switch unit 2 is connected with one or more input optical fiber and a plurality of output optical fibers. The number of the input optical fibers may be the same as that of the output optical fibers, or may be different from each other. However, it is assumed in the following embodiment that the number of input optical fibers is the same as that of the output optical fibers. In addition, the switch unit 2 is provided with a plurality of mirrors for guiding an input light beam to a desired output optical fiber. The switch unit 2 provides an optical path that guides the light beam input from any optical fiber into any output optical fiber by controlling the angle of a mirror specified by the control unit 3. That is, the switch unit 2 controls the angle of a specified mirror according to an instruction from the control system 3 to provide a desired optical path.

In the optical switch 1 according to the embodiment, each of the mirrors within the switch unit 2 rotates in accordance with the applied drive voltage. The mechanism of rotating the mirrors by using drive voltage is not particularly limited; however, it is assumed in this embodiment that the rotation angle of the mirror is proportional to the square of the drive voltage. The mirrors provided to the switch unit 2 are manufactured, for example, with MEMS manufacturing method. However, the mirrors may be manufactured with different method.

The control system 3 controls the switch unit 2 in accordance with an instruction of setting a desired optical path. Here, the control system 3 controls the angle of one or more mirrors to establish the specified optical path. When the optical switch 1 is used in a communication system, an optical path is specified by, for example, a communication control application. The control system 3 may include a digital signal processor, however, the control system may be realized by different configuration. The optical signal output from the switch unit 2 is branched by an optical branching unit 4, and is guided to the control system 3. The optical branching unit 4 is realized by, for example, a plurality of optical couplers.

Figure 2A:
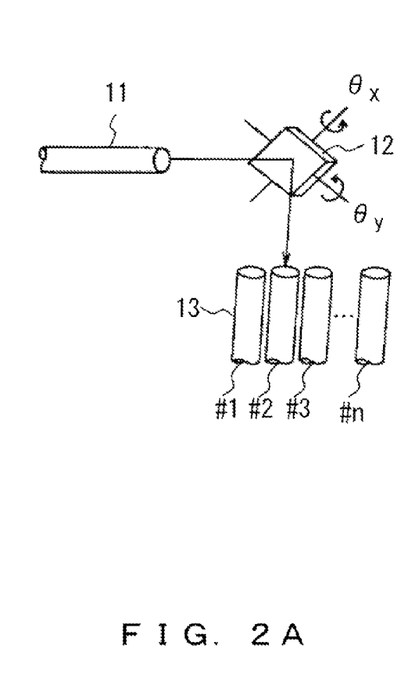
FIGS. 2A and 2B are diagrams illustrating optical systems of a switch unit.
Figure 2B:
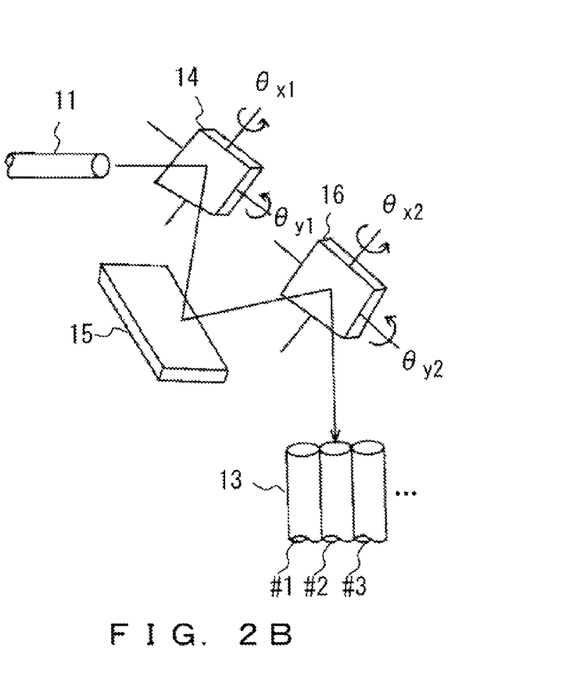

FIG. 2A and FIG. 2B are diagrams illustrating optical systems of the switch unit 2. In FIG. 2A and FIG. 2B, a light beam that is input via an input optical fiber 11 is illustrated.

FIG. 2A illustrates an optical system of one-stage reflection. In this embodiment, the light beam input via the input optical fiber 11 is reflected by the mirror 12 to be guided to an output optical fiber #2 of an output fiber array 13. The mirror 12 is rotatable about x axis and about y axis. Here, rotation angles $\theta x$ and $\theta y$ are independently controlled by drive voltages $Vx$ and $Vy$ that are generated by the control system 3. At this time, the control system 3 generates the drive voltages $Vx$ and $Vy$ to rotate the mirror 12 such that the light beam input from the input optical fiber 11 is guided to the output optical fiber #2.

An optical switch having n input ports and n output ports includes, for example, n mirrors #1-#n. In this case, the light beam input from the input optical fiber #1 is guided to the mirror #1. Similarly, the light beams input from the input optical fibers #2-#n are respectively guided to the corresponding mirrors #2-#n. The angles of the mirrors #1-#n are independently controlled by the control system 3.

FIG. 2B illustrates an optical system of two-stage reflection. In this example, the light beam input via the input optical fiber 11 is sequentially reflected by mirrors 14, 15, and 16 to be guided to the output optical fiber #2. The mirror 14 is configured to be rotatable about x axis and y axis. Rotation angles $\theta x1$ and $\theta y1$ of the mirror 14 are independently controlled by the drive voltages $Vx1$ and $Vy1$ that are generated by the control system 3. Similarly, the mirror 16 is configured to be rotatable about x axis and y axis, and rotation angles $\theta x2$ and $\theta y2$ of the mirror 16 are independently controlled by the drive voltages $Vx2$ and $Vy2$ that are generated by the control system 3. Here, the control system 3 generates the drive voltages $Vx1$, $Vy1$, $Vx2$ and $Vy2$ to rotate the mirrors 14 and 16 such that the light beam input from the input optical fiber 11 is guided to the output optical fiber #2. The drive voltages $Vx1$ and $Vx2$ may be the same one another, or be different from each other. Similarly, the drive voltages $Vy1$ and $Vy2$ may be the same one another, or be different from each other. Note that the mirror 15 is fixed in this embodiment.

In an n-input-n-output optical switch with two-stage reflection, for example, input-side mirrors #1-#n are provided for the respective input optical fibers #1-#n, and output-side mirrors #1-#n are provided for the respective output optical fibers #1-#n. In this case, the light beams input from the input optical fibers #1-#n are respectively guided to the corresponding input-side mirrors #1-#n. In addition, the light beams output to the output optical fibers #1-#n are respectively guided to the corresponding output-side mirrors #1-#n. For example, when the light beam input from the input optical fiber #1 is output the output optical fiber #2, the input-side mirror #1 is controlled such that the input light beam is guided to the output-side mirror #2 via the mirror 15. The output-side mirror #2 is controlled such that the light beam is guided to the output optical fiber #2.

Figure 3:
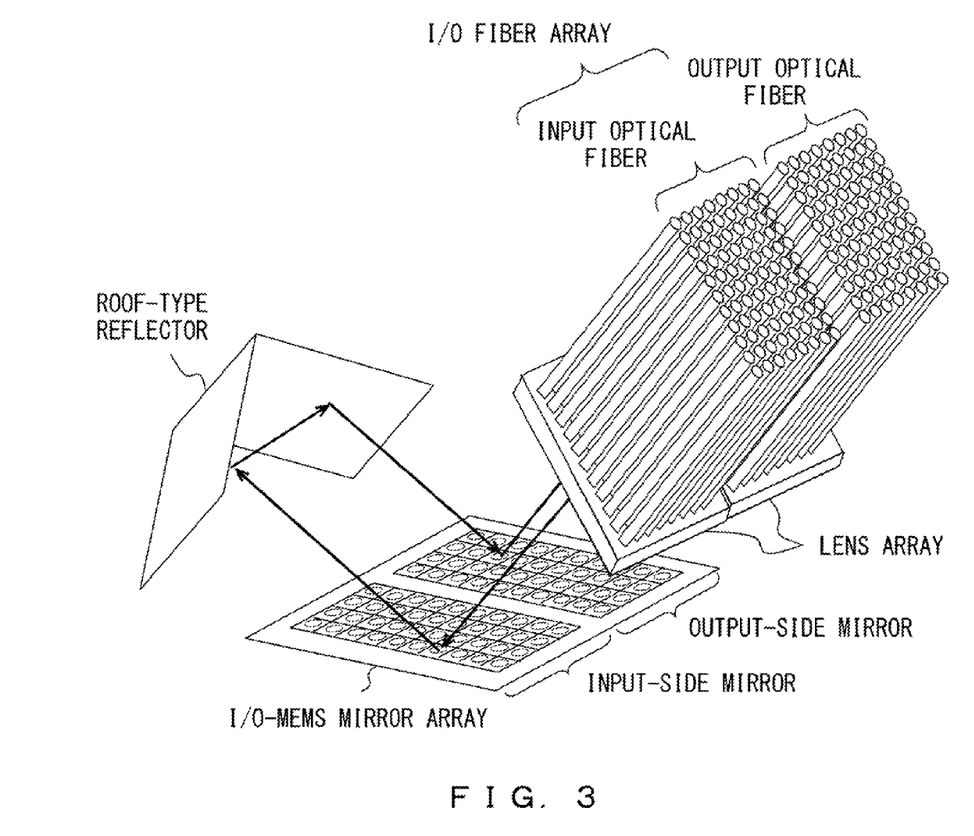
FIG. 3 is an embodiment of a switch unit.

FIG. 3 is an embodiment of the switch unit 2. In this embodiment, a plurality of input optical fibers and a plurality of output optical fibers are accommodated in an I/O fiber array. On an end face of the I/O fiber array, a lens array is provided for generating a collimate beam. An I/O-MEMS mirror array is provided with a plurality of input-side mirrors and a plurality of output-side mirrors. The angle of each input-side mirror and output-side mirror is controlled by the drive voltage that is generated by the control system 3. The light beam input via the input optical fiber is sequentially reflected by the input-side mirror, the roof-type reflector, and the output-side mirror to be guided to a specified output optical fiber. Accordingly, the input light beam is guided to a desired output optical fiber. Namely, desired optical path is provided by the control of the control system 3.

FIG. 1 is now referred to again. The system controller 21 provides an interface with a host device, and controls the operations of each element of the control system 3. In this embodiment, the host device designates an optical path to the optical switch 1. For example, the host device designates an input optical fiber and an output optical fiber of the switch unit 2 to transmit an optical signal. The system controller 21 provides a controller 22 and a low-frequency signal generator 31 with path information in accordance with a designation from the host device. The path information specifies, for example, a pair of an input port and an output port (i.e., a pair of an input optical fiber and an output optical fiber).

The controller 22 generates a control signal for designating a target rotation angle of a corresponding mirror in the switch unit 2 in accordance with the path information. At this time, the controller 22 generates the control signal by referring to an initial-value memory 23. Here, the rotation angle of the mirror of the optical switch 1 is uniquely controlled by the provided drive voltage. The controller 22 then outputs as a control signal the drive voltage data that represents the drive voltage corresponding to the target rotation angle of the mirror.

Figure 4:
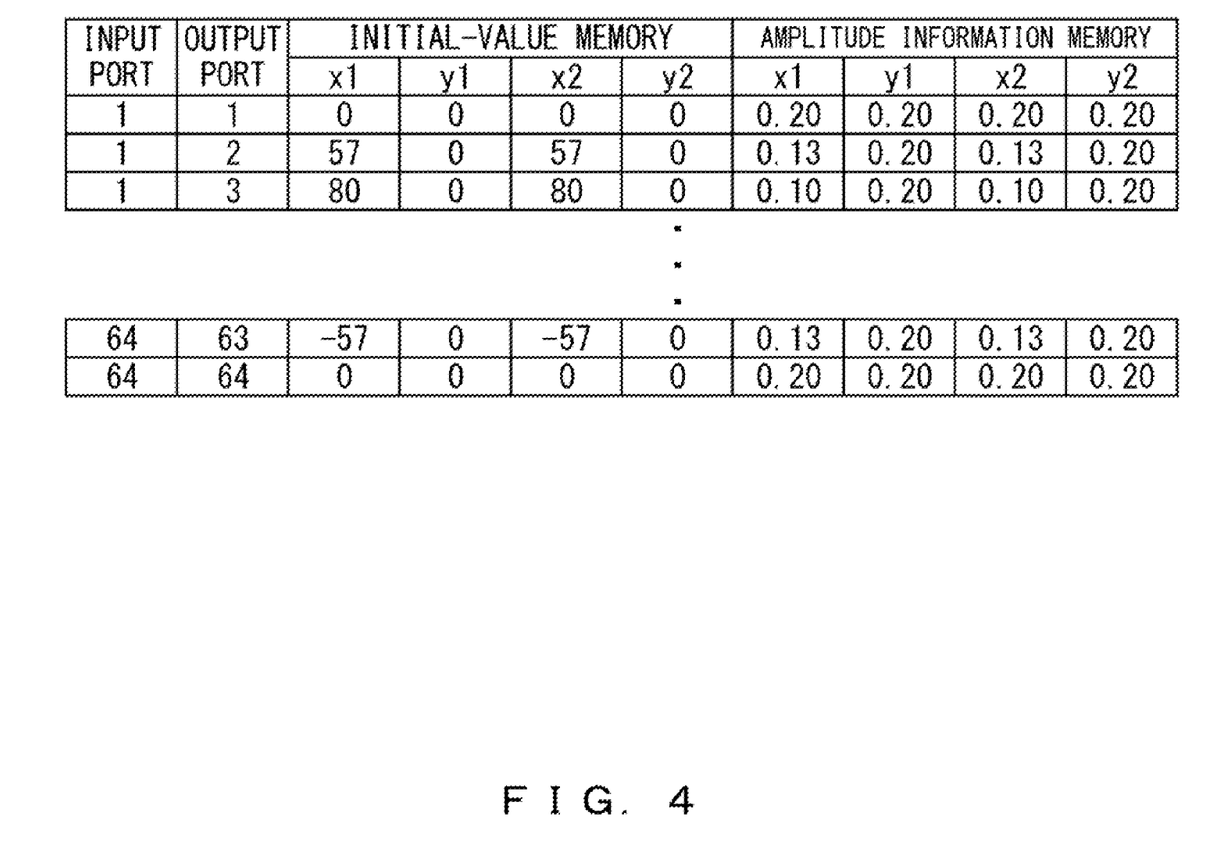
FIG. 4 is an embodiment of an initial-value memory and an amplitude information memory.

FIG. 4 is an embodiment of the initial-value memory 23 and an amplitude information memory 38. In this embodiment, the switch unit 2 is a 64×64 switch. The 64×64 switch is an optical switch having 64 input ports and 64 output ports. Moreover, the switch unit 2 is configured to be two-stage reflection system in this embodiment. Namely, the switch unit 2 is provided with input-side mirrors #1-#64 and output-side mirrors #1-#64. The amplitude information memory 38 will be described later.

In the initial-value memory 23, drive voltage data X1, Y1, X2, and Y2 is stored for each optical path. Here, the optical path is designated, for example, by a pair of an input port and an output port. The drive voltage data X1 and Y1 represents the voltage values for controlling rotation angles θx1 and θy1 of the corresponding input-side mirror, respectively. Similarly, the drive voltage data X2 and Y2 represents the voltage values for controlling rotation angles θx2 and θy2 of the corresponding input-side mirror, respectively.

For example, the control information for setting the optical path [1, 1 (input port #1/output port #1)] is as follows:
(a) Input-side mirror to be controlled: #1
(b) Output-side mirror to be controlled: #1
(c) Drive voltage X1 for input-side mirror: 0 (volt)
(d) Drive voltage Y1 for input-side mirror: 0
(e) Drive voltage X2 for output-side mirror: 0
(f) Drive voltage Y2 for output-side mirror: 0

The control information for setting the optical path [1, 2 (input port #1/output port #2)] is as follows:
(a) Input-side mirror to be controlled: #1
(b) Output-side mirror to be controlled: #2
(c) Drive voltage X1 for input-side mirror: 57 (volt)
(d) Drive voltage Y1 for input-side mirror: 0
(e) Drive voltage X2 for output-side mirror: 57
(f) Drive voltage Y2 for output-side mirror: 0

The controller 22 extracts the drive voltage data X1, Y1, X2, and Y2 corresponding to the path information from the initial-value memory 23, and outputs the extracted voltage data as a control signal. In addition, the controller 22 notifies a MEMS driver 25 of the mirror identification information that specifies a pair of an input-side mirror and an output-side mirror to be controlled.

A digital filter 24 is, for example, a FIR filter for removing a resonance frequency fr from the control signal. Note that the digital filter 24 may be realized by different configuration. The MEMS driver 25 generates drive voltages Vx1, Vy1, Vx2, and Vy2 in accordance with the control signal to control the rotation angles of the mirrors that are specified by the mirror identification information.

Figure 5:
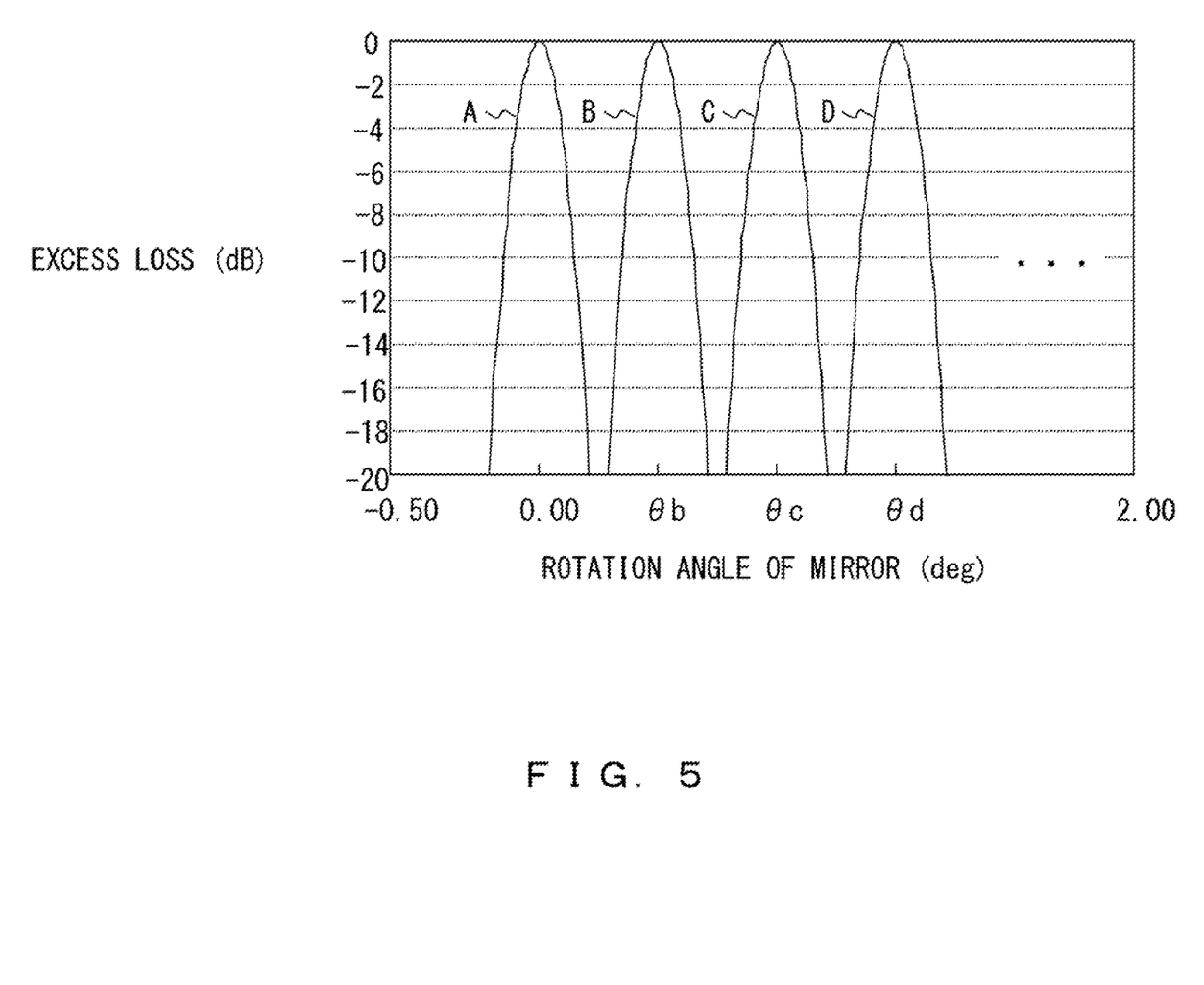
FIG. 5 is a diagram illustrating tolerance curves with respect to rotation angle of a mirror.

FIG. 5 is a diagram illustrating tolerance curves with respect to rotation angle of a mirror of the switch unit 2. The tolerance curve in the embodiment represents excess loss (or optical power) with respect to a rotation angle of a mirror (or drive voltage to rotate a mirror). Here, the rotation angle of the mirror is defined as "zero" when the drive voltage is zero. In addition, the excess loss is defined as "zero" when the mirror is adjusted to an optimal angle. The tolerance curves of each mirror are assumed to be the same. Furthermore, the tolerance curves are assumed to be the same between the rotation about the X axis and the rotation about the Y axis.

A tolerance curve A represents the excess loss of the optical path in which an input port number and an output port number matches one another (for example, the optical path in which the light beam input from the input port #1 is directed to the output port #1). This optical path (hereinafter, optical path A) is set by controlling the rotation angles θx1, θy1, θx2, θy2) of the corresponding mirrors to be zero. For the optical path A, excess loss occurs when the rotation angle is misaligned from zero.

A tolerance curve B represents the excess loss of an optical path B in which the difference between input/output ports is "1" (for example, the optical path in which the light beam input from the input port #1 is directed to the output port #2). The optical path B is set by controlling the rotation angles of the corresponding mirrors to be "θb". In the optical path B, excess loss occurs when the rotation angle is misaligned from θb.

Similarly, an optical path C in which the difference between input/output ports is "2" (for example, the optical path in which the light beam input from the input port #1 is directed to the output port #3) is set by controlling the rotation angles of the corresponding mirrors to be "θc". Moreover, an optical path D in which the difference between input/output ports is "3" (for example, the optical path in which the light beam input from the input port #1 is directed to the output port #4) is set by controlling the rotation angles of the corresponding mirrors to be "θd". Moreover, the tolerance curves of each optical path are similar as illustrated in FIG. 5.

As described above, a desired optical path is obtained by controlling the rotation angles of specified mirrors of the switch unit 2. Namely, the control system 3 controls the rotation angles of the corresponding mirrors to establish the specified optical path. Here, the rotation angles of mirrors are controlled by the drive voltages. For this purpose, in the initial-value memory 23 of the control system 3, the drive voltage data (i.e., the data representing target drive voltages) providing the rotation angles that correspond to each optical path is stored. According to the drive voltage data that provides the specified optical path, the control system 3 controls the rotation angles of the mirrors that correspond to the specified optical path. Accordingly, the specified optical path is set.

However, the relationship between the drive voltage and the rotation angle of a mirror varies depending on the temperature, the age-related deterioration, or the like. For this reason, when the switch unit 2 is driven in accordance with the drive voltage stored in the initial memory 23, the optical loss sometimes gets worse as the rotation angle of mirror is misaligned from an optimal value. Therefore, the optical switch 1 according to the embodiment is provided with the function of correcting the drive voltage data stored in the initial-value memory 23 by monitoring the output light beam. The function of correcting the drive voltage data (or, control signal) will be described hereinafter.

In this embodiment, the drive voltage is corrected by a dithering method that uses a low-frequency signal. The low-frequency signal is generated by a low-frequency signal generator 31.

The low-frequency signal generator 31 generates a low-frequency signal that corresponds to the optical path specified by the path information. The low-frequency signal is, for example, a sine wave. A frequency f1 of the low-frequency signal is not particularly limited; however, it is, for example, several kHz to several tens of kHz.

An adder 32 superimposes the generated low-frequency signal on the control signal that is generated by the controller 22. Here, the low-frequency signal is, for example, a digital data sequence representing a sine wave of the above frequency. In this case, the adder 32 sequentially adds that digital data sequence to the drive voltage data. After that, the MEMS driver 25 drives the switch unit 2 by the drive voltage on which the low-frequency signal is superimposed. Accordingly, the rotation angle of a mirror corresponding to the specified optical path fluctuates according to the low-frequency signal.

The optical signal output from the switch unit 2 is branched by the optical branching unit 4, and is guided to the control system 3. A photo detector (O/E) 33 is, for example, a photodiode, and converts the received optical signal into an electrical signal. In this embodiment, this electrical signal is converted into digital data by an A/D converter (not shown). A digital filter 34 extracts a frequency component f1 from the digital data sequence that represents the optical signal output from the switch unit 2. Namely, a frequency component of the low-frequency signal is extracted. The digital filter 34 is not particularly limited; however, it is, for example, an FIR filter. An amplitude detector 35 detects the amplitude of the extracted frequency component f1 by performing digital computation.

An FB controller 36 performs a feedback control on the drive voltage based on the amplitude of the frequency component f1. In this example, a correction value is calculated for correcting the drive voltage such that the amplitude of the frequency component f1 is minimized or that the amplitude of the frequency component f1 is smaller than a specified threshold. This correction value represents a DC voltage, and is added to the low-frequency signal by the adder 37. This low-frequency signal is, as described above, superimposed on the control signal. Accordingly, the correction value is added to the drive voltage. Therefore, the drive voltage is corrected by the feedback signal, and is thereby optimized.

Figure 6A:
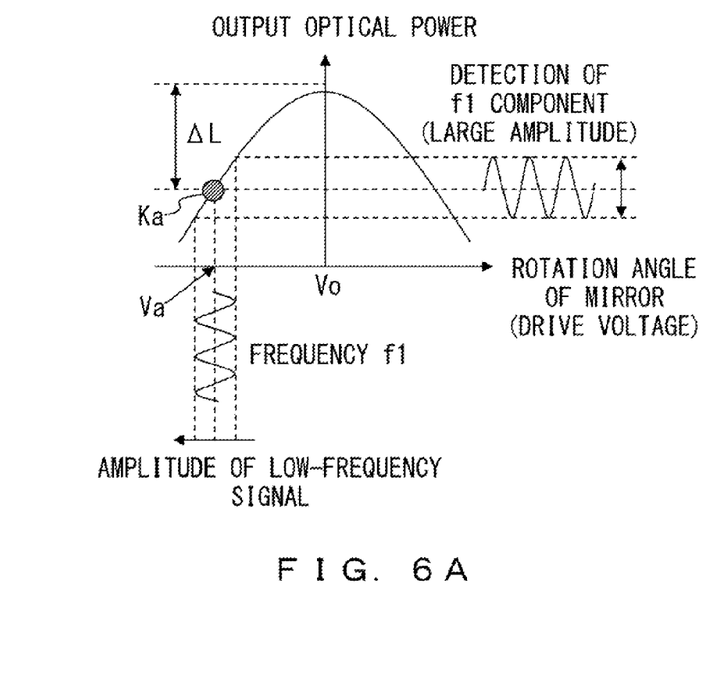
FIGS. 6A and 6B are diagrams illustrating a method for correcting drive voltage.
Figure 6B:
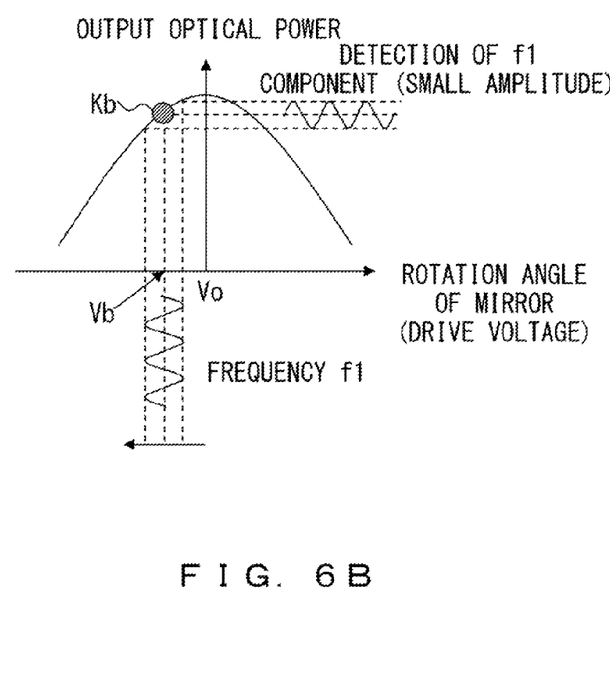

FIG. 6A and FIG. 6B are diagrams illustrating a method for correcting drive voltage by using a low-frequency signal. It is assumed in the example illustrated in FIG. 6A and FIG. 6B that when the drive voltage is "Vo", the rotation angle of the corresponding mirror is optimized, and thus the loss of the optical path is minimized. Namely, "Vo" is a target drive voltage.

In the example illustrated in FIG. 6A, the drive voltage is "Va". In this case, excess loss $\Delta L$ occurs. The low-frequency signal is superimposed on the drive voltage Va. Accordingly, the rotation angle of the driven mirror fluctuates depending on the frequency f1, and the output optical power of the switch unit 2 also fluctuates at the frequency f1. In other words, the output light from the switch unit 2 includes an f1 component. The amplitude of f1 component depends on the inclination of tolerance curve at an operating point Ka, and is detected by the amplitude detector 35. After that, the FB control unit 36 corrects the drive voltage so as to decrease the detected f1 component. In the example illustrated in FIG. 6A, a correction value to increase the drive voltage is generated. Accordingly, the optical loss will be reduced since the drive voltage gets close to the target voltage V0 and the rotation angle of the mirror gets close to the optimal value.

In the example illustrated in FIG. 6B, the error between a drive voltage Vb and the target voltage V0 is small, and the excess loss is also small. In this case, the inclination of tolerance curve at an operating point Kb is gentle. Accordingly, supposing that the amplitude of the input low-frequency signal is constant, the amplitude of f1 component extracted from the output light becomes smaller than that of FIG. 6A. Here, if the amplitude of the extracted f1 component is smaller than a threshold, the FB control unit 36 maintains the current correction value. In other words, the current drive voltage is maintained, and the rotation angle of mirror is also maintained. As a result, an optical path with small loss is obtained.

As described above, in the optical switch 1 according to the embodiment, the drive voltage is controlled in the feedback system by a dithering method. Accordingly, even if the characteristics of the optical switch 1 are changed due to the temperature, the age-related deterioration, or the like, the loss in the optical path will constantly be small.

Figure 7:
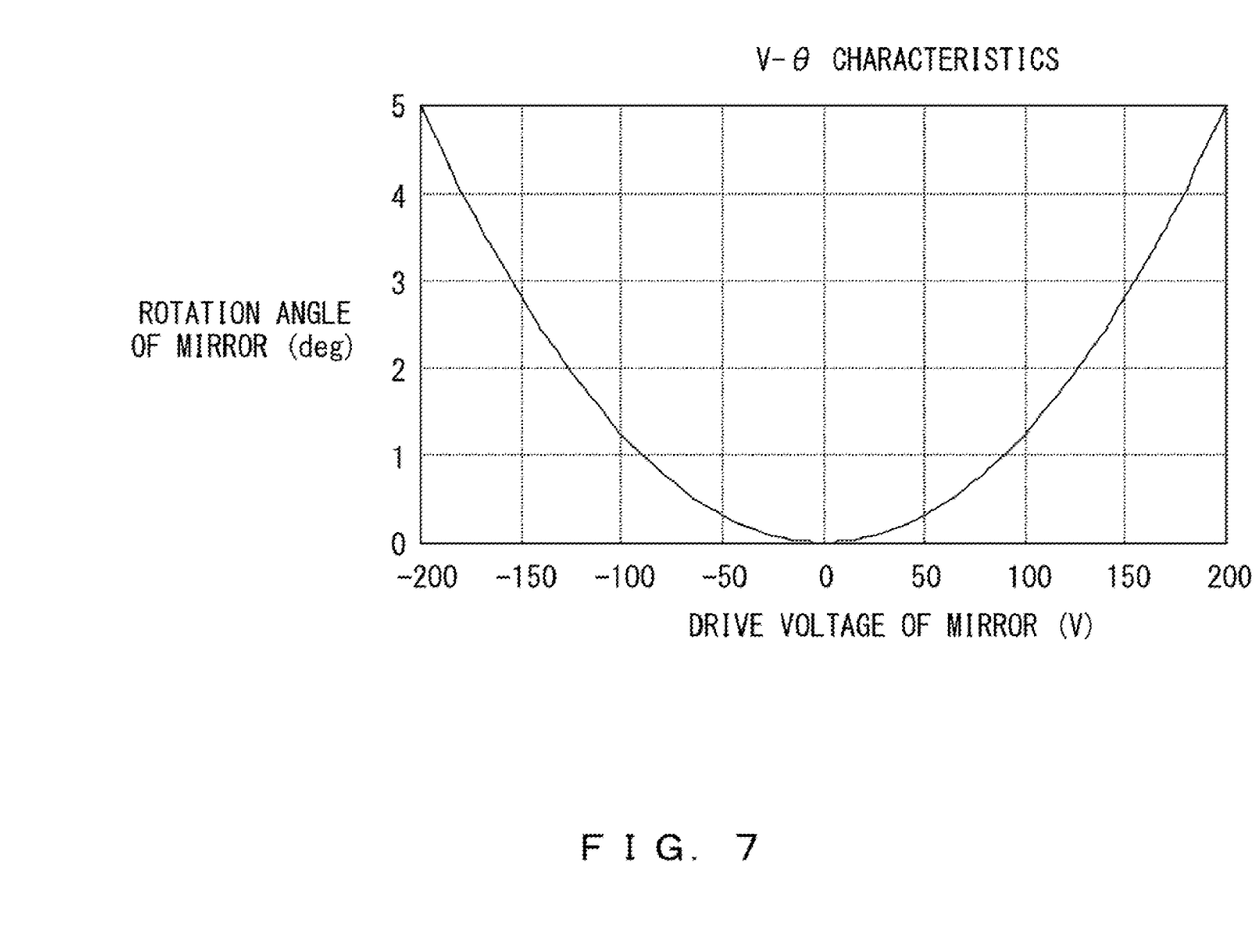
FIG. 7 is a diagram illustrating the relationship between drive voltage and rotation angle (V-θ characteristic).

However, in the optical switch 1 according to the embodiment, the rotation angle of each mirror does not change linearly with respect to the drive voltage. In this embodiment, the rotation angle of each mirror is proportional to the square of drive voltage as illustrated in FIG. 7.

Figure 8:
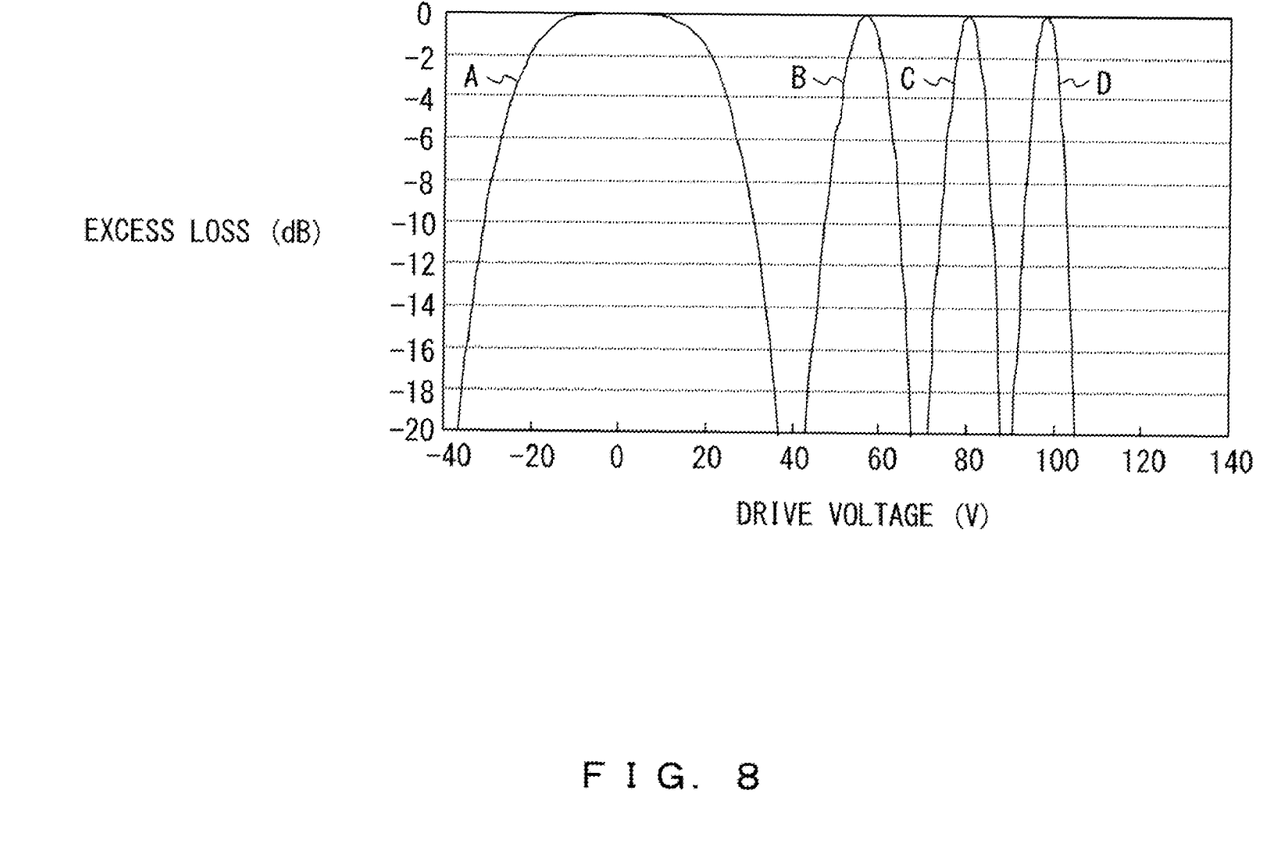
FIG. 8 is a diagram illustrating tolerance curves with respect to drive voltage.

In this case, the tolerance curves with respect to the drive voltage are different for every optical path as illustrated in FIG. 8. Namely, when an optical path is established with small drive voltage, the inclination for a tolerance curve with respect to the drive voltage is gentle. On the other hand, when an optical path is established with large drive voltage, the inclination for a tolerance curve with respect to the drive voltage is steep. In the example illustrated in FIG. 8, the inclination of the tolerance curve A (that is, a tolerance curve for the optical path A) is the gentlest, and the inclination of a tolerance curve D (that is, a tolerance curve for the optical path D) is the steepest.

Figure 9A:
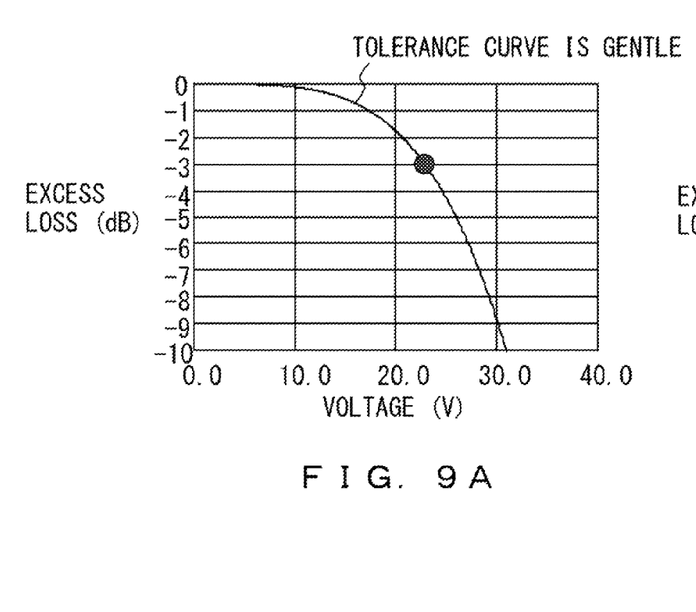
FIG. 9A and FIG. 9B are diagrams illustrating the relationship between drive voltage and excess loss.
Figure 9B:
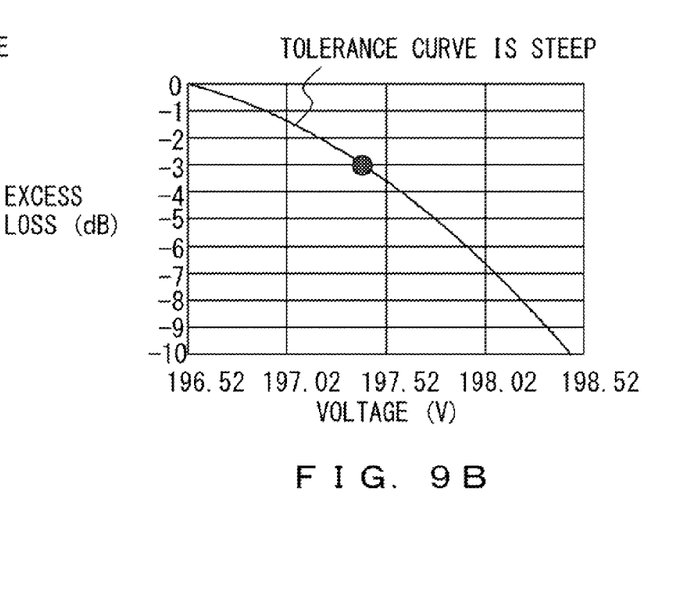

FIG. 9A and FIG. 9B are diagrams illustrating the relationship between the drive voltage and the excess loss. FIG. 9A illustrates the tolerance curve of the optical path obtained by the smallest drive voltage (in the embodiment, zero). In this example, when the error of the drive voltage is about 23 volts, the excess loss becomes 3 dB. On the other hand, FIG. 9B illustrates the tolerance curve of the optical path obtained by a large drive voltage (in the embodiment, 196.52 volt). In this example, when the error of the drive voltage is about 0.8 volts, the excess loss becomes 3 dB. As described above, the inclination of tolerance curve is gentle in a region where the drive voltage is small, and the inclination of tolerance curve is steep in a region where the drive voltage is large. It is to be noted that the scales of horizontal axes are different between FIG. 9A and FIG. 9B.

In the dithering method used in the embodiment, the drive voltage is controlled by making the output optical power fluctuate with the use of a low-frequency signal. However, when the output optical power fluctuates, generally, the quality of an optical signal deteriorates. For this reason, when the dithering method is used, the fluctuation of output optical power is regulated under a specified level (for example, under 0.3 dB).

Here, it is assumed in the optical path illustrated in FIG. 9A that the amplitude of input low-frequency signal is determined such that the fluctuation of the output optical power due to the low-frequency signal becomes 0.1 dB when the excess loss is 3 dB. In this case, the amplitude of the input low-frequency signal is 0.2Vpp. Here, the amplitude of the input low-frequency signal is supposed to be constant regardless of the drive voltage. That is to say, also in the optical path illustrated in FIG. 9B, it is assumed that a low-frequency signal of 0.2Vpp is superimposed on the drive voltage. In that case, in the optical path illustrated in FIG. 9B, the fluctuation of output optical power due to the low-frequency signal becomes about 1 dB since the tolerance curve is steep. Furthermore, when the drive voltages are simultaneously controlled for the x axis and the y axis of the input-side mirror and for the x axis and the y axis of the output-side mirror, the fluctuation of output optical power becomes 4 dB at worst. In other words, in a region where the drive voltage is large, the fluctuation of output optical power due to the low-frequency signal may exceed an allowed level.

On the other hand, it is assumed in the optical path illustrated in FIG. 9B that the amplitude of the input low-frequency signal is determined such that the fluctuation of output optical power due to the low-frequency signal becomes 0.1 dB when the excess loss is 3 dB. In this case, the amplitude of the input low-frequency signal is 0.04Vpp. Moreover, also in the optical path illustrated in FIG. 9A, it is assumed that a low-frequency signal of 0.04Vpp is superimposed on the drive voltage. In that case, in the optical path illustrated in FIG. 9A, the fluctuation of output optical power due to the low-frequency signal becomes very small, and thereby the adjustment sensitivity of correcting the drive voltage becomes worse.

As described above, if it is intended to secure the adjustment sensitivity in a region where the drive voltage is small when the amplitude of the input low-frequency signal is constant, the quality of an optical signal deteriorates in a region where the drive voltage is large. On the contrary, if it is intended to prevent the quality from deteriorating in a region where the drive voltage is large, the adjustment sensitivity becomes low in a region where the drive voltage is small.

In order to solve this problem, the amplitude of the low-frequency signal for dithering is determined according to the drive voltage (i.e., target rotation angle of a mirror) in the optical switch 1 according to the embodiment. Specifically, the low-frequency signal generator 31 increases the amplitude of the low-frequency signal in a region where the target rotation angle is small, and decreases the amplitude of the low-frequency signal in a region where the target rotation angle is large, according to the path information.

The low-frequency signal generator 31 determines the amplitude of the low-frequency signal by referring to the amplitude information memory 38 illustrated in FIG. 4 according to the path information. In the amplitude information memory 38, the amplitude values of low-frequency signals to be respectively used for correcting the drive voltages Vx1, Vy1, Vx2, and Vy2 are stored for each optical path. In the embodiment illustrated in FIG. 4, the amplitude of the low-frequency signal is 0.20Vpp when the drive voltage for rotating a mirror is zero. Moreover, the amplitudes of the low-frequency signal are respectively 0.13Vpp and 0.10Vpp when the drive voltages are 57V and 80V.

The relationship between the amplitude of the low-frequency signal and the drive voltage is calculated in advance by, for example, simulation or measurement, and is stored in the amplitude information memory 38. The amplitude of the low-frequency signal is determined in such a way that, for example, the amplitude of low-frequency component extracted from the output light becomes a specific value (for example, 0.1 dB) when the excess loss is at a specific value (for example, 3 dB). In this embodiment, the amplitude of low-frequency signal for each mirror and for each rotation axis is represented by 2-byte information. Here, two mirrors are used to realize an optical path in the switch unit 2, and each mirror has two rotation axes. Then, 8-byte is used for one optical path. Accordingly, for example, in a 64×64 switch, the capacity of the amplitude information memory 38 is about 32 kB. Here, when the drive voltage data X1 and X2 are the same one another and the drive voltage data Y1 and Y2 are the same one another, the capacity of the amplitude information memory 38 is reduced to the half.

The operation performed when the path information is input to the optical switch 1 according to the embodiment is described. Here, it is assumed that the path information for setting the optical path [1, 2 (input port #1/output port #2)] is provided from the host device.

(STEP 1) The controller 22 generates a control signal that corresponds to the specified optical path by referring to the initial-value memory 23 illustrated in FIG. 4. This control signal includes the following drive voltage data:
(a) Drive voltage X1 for input-side mirror: 57
(b) Drive voltage Y1 for input-side mirror: 0
(c) Drive voltage X2 for output-side mirror: 57
(d) Drive voltage Y2 for output-side mirror: 0

Here, mirror identification information is generated for identifying a pair of an input-side mirror and an output-side mirror to be controlled according to the path information. The mirror identification information includes, for example, the following information element:
(a) Input-side mirror to be controlled: #1
(b) Output-side mirror to be controlled: #2

(STEP 2) The low-frequency signal generator 31 determines the amplitude of the low-frequency signal by referring to the amplitude information memory 38 according to the path information. In the example illustrated in FIG. 4, the following amplitude information is obtained:
(a) Amplitude of low-frequency signal to be used for correcting drive voltage for rotating input-side mirror #1 about X axis: 0.13Vpp
(b) Amplitude of low-frequency signal to be used for correcting drive voltage for rotating input-side mirror #1 about Y axis 0.20Vpp
(c) Amplitude of low-frequency signal to be used for correcting drive voltage for rotating output-side mirror #2 about X axis: 0.13Vpp
(d) Amplitude of low-frequency signal to be used for correcting drive voltage for rotating output-side mirror #2 about Y axis: 0.20Vpp Then the low-frequency signal generator 31 generates four sets of low-frequency signal data to be used for correcting drive voltages for rotating input-side mirror about X axis and Y axis, and output-side mirror about X axis and Y axis. The low-frequency signal data is digital data sequence representing a sine wave with an obtained amplitude.

(STEP 3) The adder 24 superimposes each of the low-frequency signals on corresponding control signals, respectively. In other words, the adder 24 sequentially adds four sets of low-frequency signal data to corresponding drive voltage data X1, Y1, X2, and Y2, respectively.

(STEP 4) The MEMS driver 25 controls the rotation angles of a pair of specified input-side mirror and output-side mirror with the following drive voltages:
(a) Drive voltage for rotating input-side mirror #1 about X axis: 57V (DC)+0.13Vpp (for example, sine wave)
(b) Drive voltage for rotating input-side mirror #1 about Y axis: 0V (DC)+0.20Vpp (for example, sine wave)
(c) Drive voltage for rotating output-side mirror #2 about X axis: 57V (DC)+0.13Vpp (for example, sine wave)
(d) Drive voltage for rotating output-side mirror #2 about Y axis: 0V (DC)+0.20Vpp (for example, sine wave)

By so doing, an optical signal input via the input port #1 is reflected by the input-side mirror #1 and the output-side mirror #2 and directed to the output port #2. Here, the input-side mirror #1 is controlled by the above drive voltages (a) and (b). Similarly, the output-side mirror #2 is controlled by the above drive voltages (c) and (d). Thus, the optical signal output from the switch unit 2 includes four low-frequency signals corresponding to the above drive voltages (a)-(d).

(STEP 5) The feedback system (the amplitude detector 35) detects the amplitude of low-frequency component that is extracted from the output light of the output port #2.

(STEP 6) The feedback system (the FB controller 36) calculates the correction values for each drive voltage in such a way that the detected amplitude of low-frequency component is small. In this case, it is preferable that the amplitude of the low-frequency component is controlled to be minimized (for example, zero). Alternatively, the amplitude of the low-frequency component is controlled to be less than a specified threshold. Then the drive voltages are corrected by adding the calculated correction values to corresponding drive voltage data.

In STEP 6, the drive voltages Vxl, Vy1, Vx2, Vy2 may be corrected one by one. For example, when the drive voltage Vxl is corrected, the correction value for the drive voltage Vxl is adjusted by dithering method, while other correction values for drive voltages Vy1, Vx2, Vy2 are fixed. Similarly, when the drive voltage Vy1 is corrected, the correction value for the drive voltage Vy1 is adjusted by dithering method, while other correction values for drive voltages Vx1, Vx2, Vy2 are fixed. The feedback system of the embodiment sequentially corrects the drive voltages Vxl, Vy1, Vx2, Vy2 until the amplitude of the low-frequency component included in the output light satisfies a specified condition.

As described above, in the optical switch 1 according to the embodiment, the amplitude of the low-frequency signal used for correcting the drive voltage is determined according to the drive voltage. Accordingly, while the adjustment sensitivity is maintained in a region where the rotation angle of a mirror is small, the quality of optical signal in a region where the rotation angle of a mirror is large is prevented from deteriorating. Furthermore, according to the optical switch of the embodiment, the loss in the optical switch is reduced as the drive voltage is appropriately corrected.

The feedback system may control the drive voltages Vxl, Xy1, Vx2, Vy2 with time-division multiplex method. Alternatively, the feedback system may simultaneously correct the drive voltage Vxl, Xy1, Vx2, Vy2 with frequency-division multiplex method. In this case, the frequencies of low-frequency signals corresponding to the drive voltage Vxl, Xy1, Vx2, Vy2 are from each other.

In the configuration illustrated in FIG. 1, the values of the amplitude of low-frequency signal are stored in the amplitude information memory 38, but the optical switch 1 may not be provided with the amplitude information memory 38. In other words, the low-frequency signal generator 31 may calculate the amplitude of low-frequency signal according to the path information. In this case, the amplitude of low-frequency signal Vd is calculated, for example, by the following expression, where "θ" is the rotation angle (deg) of a mirror, "α" is factor of proportionality, i.e., a constant determined according to the mechanism of rotating a mirror with drive voltage, "Vi" is a drive voltage, and "A" is a fluctuation range (deg) of the rotation angle of mirror due to a low-frequency signal.

$$\theta = \alpha V_i^2$$

$$V_d = \sqrt{\frac{\alpha V_i^2 + A}{\alpha}} - V_i$$

<Other Embodiments>

In the embodiment described above, the feedback system corrects the drive voltage so as to minimize the amplitude of low-frequency component included in the output light of the switch unit 2. Here, when the rotation angle of a mirror gets close to a target rotation angle, the detected amplitude of low-frequency component becomes small, and thereby the adjustment sensitivity is lowered, as illustrated in FIG. 6A and FIG. 6B.

Figure 10A:
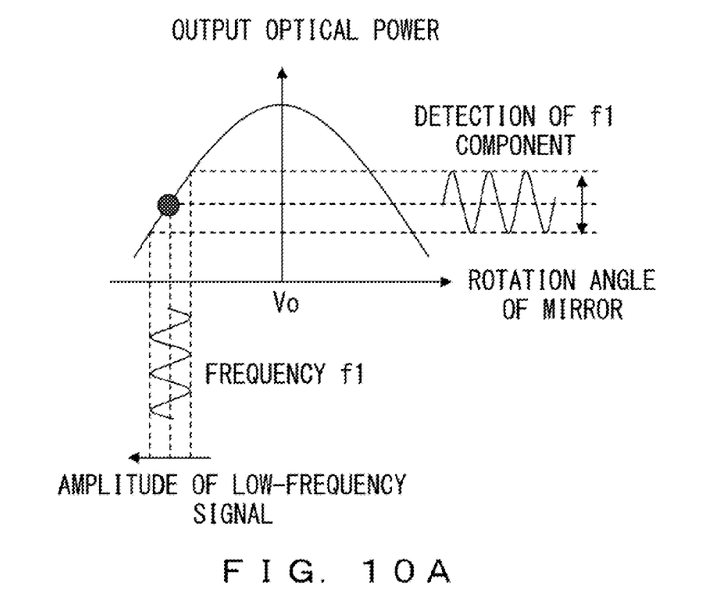
FIG. 10A and FIG. 10B are diagrams illustrating a low-frequency signal according to another embodiment.
Figure 10B:
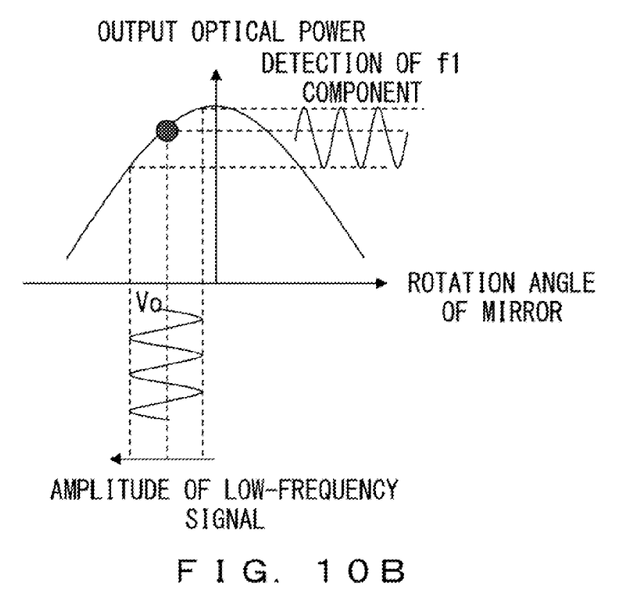

In another embodiment, the amplitude of low-frequency signal is reduced in a region where the error from a target rotation angle is large, and the amplitude of low-frequency signal is increased in a region where the error from the target rotation angle is small, as illustrated in FIG. 10A and FIG. 10B. With such a configuration, the resolution for detecting a low-frequency component does not become low even in a region where the error from the target rotation angle is low, and thus the adjustment sensitivity of drive voltage is not lowered.

In order to provide such a function, for example, the FB controller 36 transmits an amplitude control signal to the low-frequency signal generator 31 when the amplitude of low-frequency component extracted from the output light becomes smaller than a specific threshold. The low-frequency signal generator 31 increases the amplitude of low-frequency signal when the amplitude control signal is received from the FB controller 36. In this case, the low-frequency signal generator 31 determines the amplitude of low-frequency signal based on the drive voltage, and then further adjusts the amplitude in accordance with the amplitude control signal from the FB controller 36.

Moreover, in the feedback system, the correction value for correcting the drive voltage varies according to the amplitude of low-frequency component extracted from the output light. For example, in order to increase the drive voltage, a new correction value is generated by adding a modification step to the previous correction value. On the other hand, in order to decrease the drive voltage, a new correction value is generated by subtracting the modification step from the previous correction value. Here, the modification step is, for example, a constant value. However, the modification step may be determined according to the error between a target rotation angle and the rotation angle of a mirror. For example, the modification step may be increased when the error is large, and decreased when the error is small. By so doing, it takes less time until the drive voltage converges to an adequate value, and the drive voltage is precisely adjusted in a region where the error is small.

In the embodiment, the feedback system corrects the drive voltage according to the amplitude of low-frequency component extracted from the output light. However, the feedback system may correct the drive voltage by using the harmonic component of the low-frequency component. For example, the feedback system may correct the drive signal so as to maximize the double harmonic component of the low-frequency signal. In this case, the digital filter 34 extracts the harmonic component of the low-frequency signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present inventions has (have) been described in detail, it should be understood that the various changes, substitutions, and alterations could be made hereto without departing from the spirit and scope of the invention.

What is claimed is:
1. An optical switch, comprising:
a mirror configured to reflect an input light;
a controller configured to generate a control signal representing a target rotation angle of the mirror;
a generator configured to generate a low-frequency signal;

an adder configured to superimpose the low-frequency signal on the control signal;

a driver configured to drive the mirror with a drive voltage corresponding to the control signal on which the low-frequency signal is superimposed;

a detector configured to detect a frequency component or a harmonic component of the low-frequency signal included in an output light reflected by the mirror; and a correction unit configured to correct the control signal based on the detection result by the detector, wherein the generator determines an amplitude of the low-frequency signal according to the target rotation angle.

2. The optical switch according to claim 1, wherein
the generator increases an amplitude of the low-frequency signal in a region where the target rotation angle is small, and decreases an amplitude of the low-frequency signal in a region where the target rotation angle is large.

3. The optical switch according to claim 1, further comprising
a memory configured to store amplitude information representing a correspondence relationship between the target rotation angle and the amplitude of the low-frequency signal, wherein
the generator extracts amplitude information corresponding to the target rotation angle from the memory, and generates the low-frequency signal according to the extracted amplitude information.

4. The optical switch according to claim 1, wherein
a rotation angle of the mirror is proportional to a square of the drive voltage, and
the generator calculates the amplitude of the low-frequency signal according to $$V_d = \sqrt{\frac{\alpha V_i^2 + A}{\alpha}} - V_i$$

where Vd is the amplitude of the low-frequency signal, $\alpha$ is a factor of proportionality between the rotation angle of the mirror and the square of the drive voltage, $V_i$, is the drive voltage, and A is a fluctuation range of the rotation angle of the mirror generated due to the low-frequency signal, and
the generator generates the low-frequency signal according to the calculation result.

5. The optical switch according to claim 1, wherein
the generator adjusts the amplitude of the low-frequency signal based on an error between a rotation angle of the mirror and the target rotation angle.

6. The optical switch according to claim 1, wherein
the correction unit determines a modification step of correction value for correcting the control signal according to an error between a rotation angle of the mirror and the target rotation angle.

7. An optical switch, comprising:
a mirror configured to reflect an input light;
a controller configured to receive path information indicating an output optical fiber among a plurality of output optical fibers and to generate a control signal for controlling an angle of the mirror so that the input light is guided to the output optical fiber indicated by the path information after reflected by the mirror;
a generator configured to generate a low-frequency signal;
an adder configured to superimpose the low-frequency signal on the control signal;
a driver configured to drive the mirror with a drive voltage corresponding to the control signal on which the low-frequency signal is superimposed;
a detector configured to detect a frequency component or a harmonic component of the low-frequency signal included in the reflected light from the mirror; and
a correction unit configured to correct the control signal based on a detection result by the detector, wherein
the generator determines an amplitude of the low-frequency signal according to the path information.

8. A method for controlling an optical switch that includes a mirror configured to reflect an input light, comprising:
generating a control signal representing a target rotation angle of the mirror;
generating a low-frequency signal having an amplitude determined according to the target rotation angle;
superimposing the low-frequency signal on the control signal;
rotating the mirror with a drive voltage corresponding to the control signal on which the low-frequency signal is superimposed;
detecting a frequency component or a harmonic component of the low-frequency signal included in an output light reflected by the mirror; and
correcting the control signal based on the detection result of the frequency component or the harmonic component of the low-frequency signal.

* * * * *